(12) United States Patent
Weisser et al.

(10) Patent No.: US 6,227,605 B1
(45) Date of Patent: May 8, 2001

(54) OPERATING SYSTEM FOR A MOVABLE MOTOR VEHICLE PART

(75) Inventors: Dirk Weisser, Sindelfingen; Bernd Wilms, Holzgerlingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/356,500

(22) Filed: Jul. 19, 1999

(30) Foreign Application Priority Data

Jul. 18, 1998 (DE) .............................................. 198 32 385

(51) Int. Cl.$^7$ ..................................................... B60J 7/185
(52) U.S. Cl. .................................... 296/121; 292/DIG. 5; 74/129
(58) Field of Search ...................................... 296/121, 117; 74/110, 129; 292/DIG. 4, DIG. 5, DIG. 42, DIG. 43, 124; 92/31

(56) References Cited

U.S. PATENT DOCUMENTS

| 2,509,623 | 5/1950 | Baade | 296/117 |
| 2,581,660 | 1/1952 | Horton | 296/117 |
| 4,484,510 * | 11/1984 | Hirzel | 92/24 |
| 4,618,180 * | 10/1986 | Muscat | 292/DIG. 5 |
| 4,998,447 | 3/1991 | Feichtiger et al. | 74/502.6 |
| 5,467,684 * | 11/1995 | Sher | 74/129 |
| 5,772,275 | 6/1998 | Tokarz | 296/121 |

FOREIGN PATENT DOCUMENTS

| 3803550 A1 | 4/1989 | (DE) . | |
| 41 02 119 | 7/1992 | (DE) . | |
| 4308385 A1 | 11/1993 | (DE) . | |
| 196 02 021 | 12/1996 | (DE) . | |
| 2 661 140 | 10/1991 | (FR) . | |
| 665369 * | 1/1952 | (GB) | 296/117 |
| 582401 * | 1/1957 | (IT) | 74/129 |
| 406109092 * | 4/1994 | (JP) | 74/129 |

* cited by examiner

*Primary Examiner*—Dennis H. Pedder
(74) *Attorney, Agent, or Firm*—Evenson, McKeown, Edwards & Lenahan, P.L.L.C.

(57) ABSTRACT

An operating system is used for hydraulic convertible top locking systems in retractable roof convertibles. A control unit has a control piston which is loaded in one axial direction by the hydraulic driving unit and in the opposite axial direction by a mechanical pressure spring arrangement. The control piston is restrictedly guided in the circumferential and axial direction in a housing by a control contour.

13 Claims, 2 Drawing Sheets

OPERATING SYSTEM FOR A MOVABLE MOTOR VEHICLE PART

BACKGROUND OF THE INVENTION

This application claims the priority of 198 32 385.9-21, filed Jul. 18, 1998, the disclosure of which is expressly incorporated by reference herein.

The invention relates to an operating system for a movable motor vehicle part having a driving unit which, via a control unit, is connected with an operating element for the movable motor vehicle part.

Such an operating system is generally known in the form of a hydraulic convertible top locking device for a convertible. In Mercedes-Benz SL convertibles (129), the convertible top is caught in an almost closed position shortly before being placed on the windshield frame by two locking units which can be operated by one hydraulic cylinder respectively. The change into the closed end position as well as another release of the convertible top take place by admitting pressure to the hydraulic cylinders. The control of the hydraulic cylinders takes place by corresponding hydraulic valves.

SUMMARY OF THE INVENTION

An object of the present invention is to provide an operating system which permits an automatic locking and unlocking of the movable motor vehicle part by simple devices in an operationally secure manner.

This object has been achieved in that the control unit has a control piston which, in an axial position, is loaded by the driving unit and, in the opposite axial direction, is loaded by a mechanical pressure spring arrangement. The control piston is restrictedly guided in a vehicle-fixed housing, by way of a control contour in the circumferential and axial direction, and is connected in a movement-transmitting manner with the operating element. As a result, only a hydraulic cylinder is still required as the driving unit which acts on one side, because the opposite movement functions are caused by the mechanical pressure spring arrangement.

The housing assigned to the control piston and the control contour, particularly a control cylinder, represents a purely mechanical component so that seals of hydraulic chambers or flow-through pipes are eliminated. The control contour can be provided either on the control piston or on the housing. The corresponding other part, that is, the housing or the control piston, has the corresponding counterpart.

Advantageously, the control contour is constructed as a connecting link guide on the control piston or on the housing, into which a guide pin of the other control part engages. In order to permit a restricted guidance of the control piston in the circumferential and axial direction, the control piston is disposed rotatably as well as axially movably in the housing. The present invention is particularly suitable for the locking of retractable vehicle roofs but can also be used for movable vehicle body parts, such as rear lids, engine hoods, and similar parts.

As a further aspect of the invention, the control contour is a profile groove which extends on an outer circumference of the cylindrically designed control piston. A guiding pin which is fixed to the inner circumference of the housing engages in the control contour. This is a particularly simple and operationally reliable further development.

In a still further aspect of the present invention, the control contour has at least one intermediate stop which defines an intermediate position for the control piston in which the control piston can be positioned in a spring-loaded manner. Such an intermediate stop preferably forms a locking position of the movable vehicle body part, particularly of a retractable vehicle roof. The securing of the locking position of this vehicle roof in the closed condition by the end position defined in the control contour and the prestressing by the roof forces ensures that a secure closure is independent of the function of corresponding driving units.

A yet further development of the present invention divides the control contour into several contour sections which adjoin one another in a zigzag-type manner. At least a first contour section extends diagonally along the outer circumference and being acted upon by a spring force, and at least a second, adjoining profile section is axially aligned on the outer circumference and being capable of being acted upon hydraulically. As a result, locking and starting positions can be defined, in which the release from one corresponding position respectively acted upon by a spring force takes place by a brief operation of the hydraulic driving unit. The diagonal course of the first contour section along the circumference of the control piston has such a slope that in every case a self-locking of the guiding pin in the profile groove is avoided. The control contour therefore does not have a self-locking design.

According to a further feature of the invention, at least one transition area between adjoining first and second contour sections is provided with a guiding aid in the form of a stop bevel. Thereby, a hydraulic load is ensured to move the guiding pin into the desired contour section of the profile groove without any unintentionally threading into the already passed spring-force-loaded contour section.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
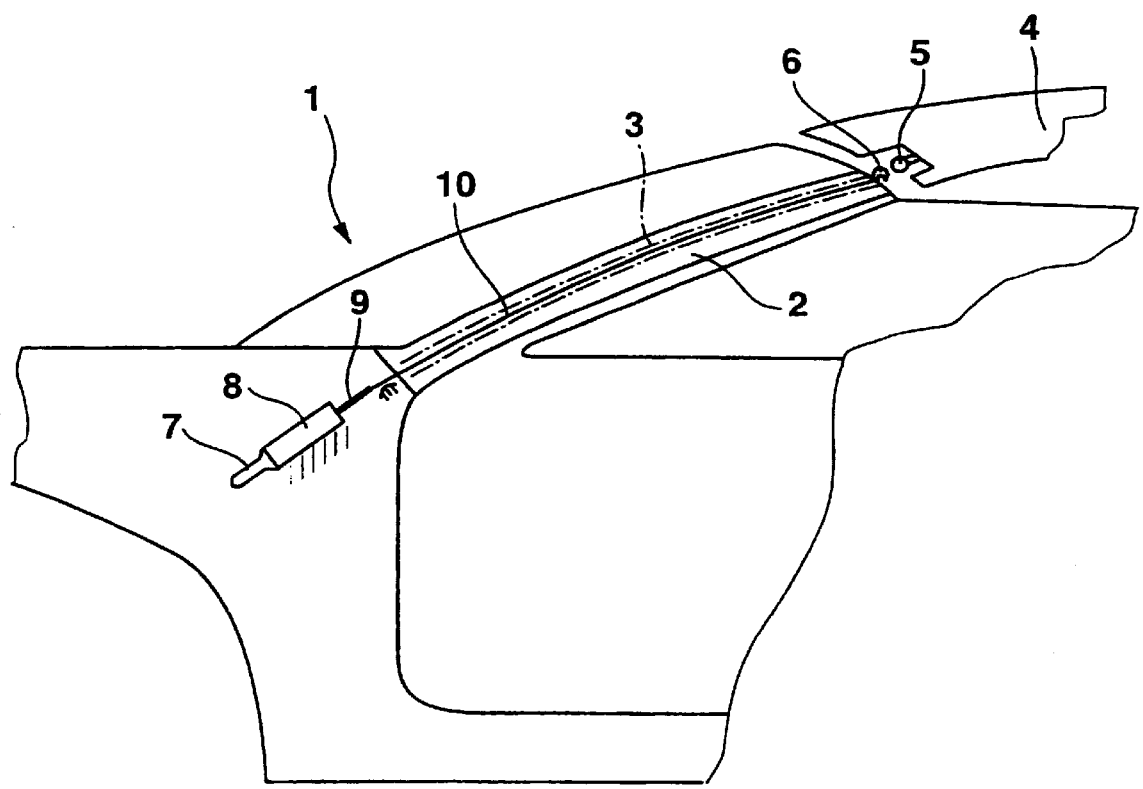
FIG. 1 is a schematic side view of a portion of a convertible at the level of a windshield frame with which an embodiment of an operating system according to the present invention for a retractable vehicle roof is associated.

FIG. 1 shows a convertible 1 which has a windshield bounded by a windshield frame. The lateral or side parts of the windshield frame are formed by one A-column 2, respectively. Each A-column 2 is designed as a multi-shell hollow profile and has an integrated reinforcing tube 3 at least at the level of the windshield and thus above the vehicle board edge (dash-dotted representation). A forward roof part 4 of a retractable roof arrangement, which is used as a movable motor vehicle part, can be placed on the windshield cross member which extends transversely above the windshield between the A-columns. In order to change the roof part 4 into its locked position pulled tightly toward the windshield cross member, one catch lug 5 respectively is assigned to the roof part 4 at the level of each A-column 2, and can be "caught" by a catch hook 6 arranged on the A-column side.

Figure 2:
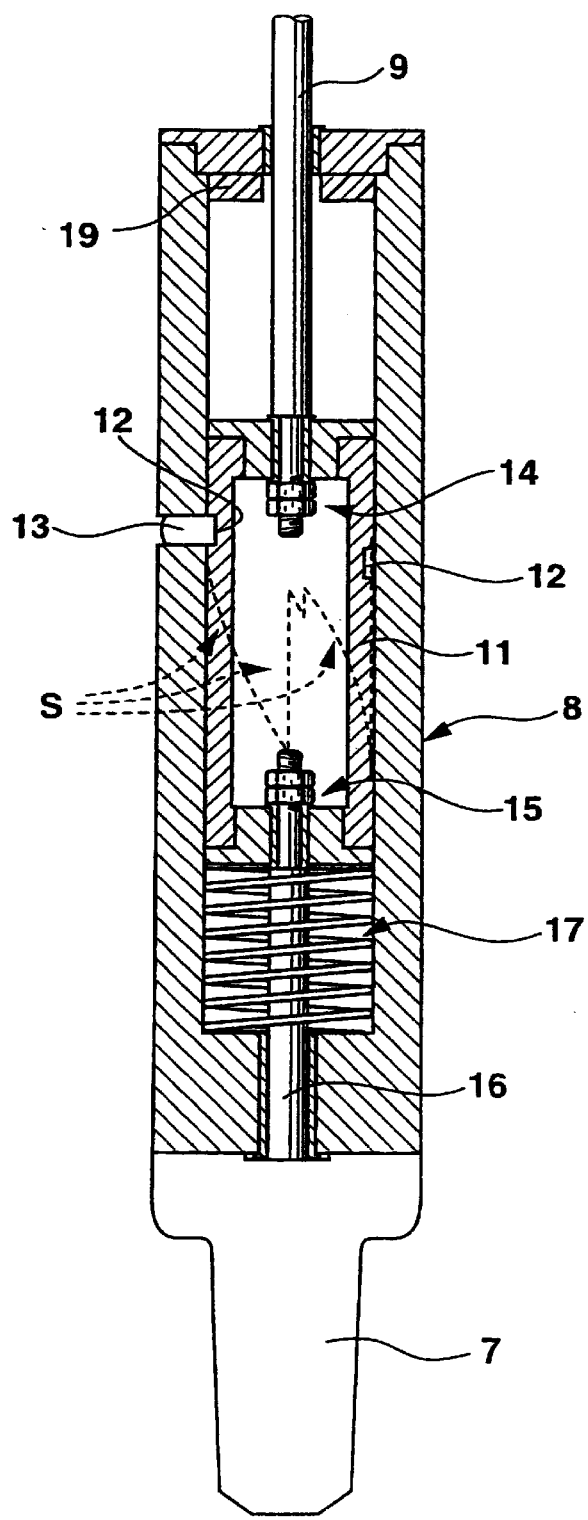
FIG. 2 is an enlarged longitudinal sectional view of a control cylinder of the operating system according to FIG. 1.

Each catch hook 6 is fastened to a tension/pressure device in the form as a Bowden cable 10 used as an operating element which is placed inside the reinforcing tube 3 and which extends through the A-column to barely below the board edge. The lower front end of each Bowden cable 10 is connected with an operating rod 9 which, as seen in FIG. 2, is rigidly fastened on one control piston 11 respectively which is movably disposed in a control cylinder 8 representing a vehicle-fixed housing. On its opposite front end, the control piston 11 is axially movably connected with a piston rod 16 which is part of a hydraulic cylinder 7 serving as the hydraulic driving unit.

The hydraulic cylinder 7 is part of a vehicle hydraulic roof system, in order to raise or lower the retractable roof arrangement. The hydraulic cylinder 7, including the control cylinder 8, is fixedly arranged on the vehicle body, the arrangement shown in FIG. 1 being illustrated only schematically. The driving unit which includes the hydraulic cylinder 7 and the control cylinder 8 can be arranged in the same manner in a footing of the A-column 2, in an assembly space in front of the windshield or in a wheel house. If, as in the present embodiment, two units consisting of hydraulic and control cylinders are provided, the hydraulic cylinders are connected in parallel and the units have an identical design.

The control piston 11 is connected by a screwed connection only axially with the piston rod 16. It can carry out a rotating movement relative to the piston rod 16 and thus relative to a longitudinal center axis of the driving unit formed of the hydraulic cylinder 7 and the control cylinder 8. The control piston 11 is mechanically restrictedly guided in a cylinder space of the control cylinder 8. At the upper front end of the cylinder space of the control cylinder 8 a damping ring 19 is provided which dampens a possible impact of the control piston 11 on the upper front end of the control cylinder 8.

For this purpose, the outer circumference of the control piston 11 has a control contour S to serve as a profile groove. The control contour S extends along the entire circumference of the control piston 11. As illustrated by the flat or planar developed view of the control contour S according to FIG. 3, the control contour S extends in a zigzag-type manner in several contour sections $f_1$ to $f_4$, $h_1$ to $h_4$. A starting point A of the control contour S corresponds to an end point A, so that a full piston rotation is situated between the two points A illustrated in FIG. 3.

A guiding pin 13 engages in the profile groove of the control contour S and is fixed in a radially aligned manner in a shell of the control cylinder 8. An inwardly projecting front end of the pin 13 engages in the profile groove 12.

According to FIG. 2, the control piston 11 is acted upon by spring force in the upward direction by a coil pressure spring 17 used as the pressure spring arrangement. In the opposite axial direction, that is, downward as viewed in FIG. 2, the control piston 11 is hydraulically moved by a pulling movement of the piston rod 16 by way of the hydraulic cylinder 7. During an adjusting movement of the control piston 11 in the upward direction, the hydraulic cylinder 7 is switched to a pressureless state by the coil pressure spring 17 so that the piston rod 16 is pulled along almost without resistance. The hydraulically acted-upon pulling movement of the piston rod 16 in the downward direction takes place against the pressure force of the coil pressure spring 17.

Figure 3:
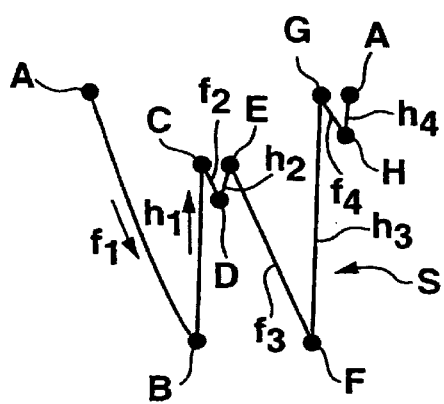
FIG. 3 is a schematic planar developed view of the control contour extending along the circumference of the control piston of the control cylinder according to FIG. 2.
Figure 4:
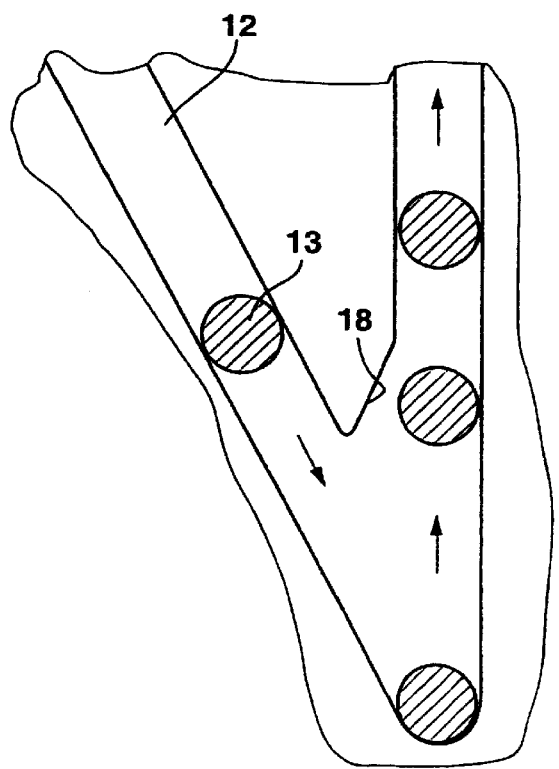
FIG. 4 is an enlarged representation of a cutout of the control contour according to FIG. 3.

The control contour S is divided into several adjoining individual contour sections $f_1$ to $f_4$, $h_1$ to $h_4$ (FIG. 3) which are alternately acted upon by the pressure spring or hydraulically. FIG. 3 illustrates position A, a starting position of the control piston 11 and thus of the operating rod 9 as well as of the Bowden cable 10 in order to be able to move out the catch hook 6. FIG. 2 illustrates the control cylinder 8 in this starting position A. The contour sections $f_1$, $f_2$, $f_3$ and $f_4$ acted upon by the pressure spring extend at a non-locking slope diagonally along the outer circumference of the control piston 11. In contrast, the contour sections $h_1$ to $h_4$ extend exactly axially in parallel to a longitudinal center axis of the control cylinder 8.

From the starting position A, the control piston 11 is pressed upwards by the pressure force of the coil pressure spring 17, whereby the guiding pin 13 is moved downward in the contour section $f_1$ of the profile groove 12. As the result of the diagonal course of the contour section $f_1$, the control piston 11 is necessarily rotated during the axial movement in the upward direction also about the longitudinal center axis. In position B, the guiding pin 13 has arrived at the lower end of the contour section $f_1$ of the profile groove 12. In this position, the catch hook 6 has completely moved out and catches the catch lug 5 of the roof part 4.

The catch hook 6 is now pulled in by an operation of the hydraulic cylinder 7 and a corresponding pulling movement of the piston rod 16, in which case the control piston 11 moves linearly downward. The guiding pin 13 slides along the contour section $h_1$ of the profile groove 12 upward to a point C, in which the roof part 4 is pulled tightly against the sealing force of the seals between the windshield cross member and the roof part 4 against the windshield cross member. As the result of switching the hydraulic cylinder 7 in a pressureless way and with the resulting aeration, the control piston 11 is pressed by the pressure force of the coil pressure spring 17 along the contour section $f_2$ of the profile groove 12 into position D which forms a stop for the guiding pin 13. This position D represents the locking end position for the roof part 4 in the closed condition.

So that the roof arrangement can be opened up again, for an unlatching of the catch hook 6, on each side of the roof part 4, the control piston 11 is pulled again by the hydraulic cylinder 7 axially in parallel to the longitudinal center axis of the control cylinder 8 into a position E in the downward direction, in which the hydraulic cylinder 7 is again switched pressureless. As the result of the spring force of the coil pressure spring 17, the guiding pin 13 now slides along the diagonally extending contour section $f_3$ of the profile groove 12 into a position F in the downward direction, in which the control piston 11 is simultaneously moved upward relative to the control cylinder 8.

In position F, the axial position of the control piston 11 corresponds to position B, the catch hook 6 has therefore moved out completely and the catch lug 5 is released. The hydraulic roof system can now lower the roof arrangement 4 into the opened condition of the convertible 1. The catch hooks 6 on both sides of the windshield, acted upon hydraulically by a pulling movement of the hydraulic cylinder 7, along the contour section $H_3$, are pulled back again into position G which corresponds to the completely retracted position of each catch hook 6. The spring force of the coil pressure spring 17 press the control piston 11, after the new pressureless-switching of the hydraulic cylinder 7, along the contour section $f_4$ into the end position H, in which each catch hook 6 is deposited in its inoperative position inside the A column 2.

In order to permit a new moving-out of each catch hook 6 and a catching of the catch lug 5, by way of hydraulic action, the control piston 11 can be pulled slightly downward from position H, whereby the guiding pin 13 moves along the contour section $h_4$ into the starting position A. Now the moving operation of the control piston 11 and thus that of the catch hook 6 is repeated.

In order to ensure that an operation of the hydraulic cylinder does not unintentionally cause a moving of the guiding pin 13 back into the already traveled contour section, the respective transition areas between contour section $f_1$ to $f_4$ acted upon by the pressure spring and contour section $h_1$ to $h_4$ acted upon hydraulically are each provided with a guiding aid in the form of a stop bevel 18.

The convertible top locking system according to FIGS. 1 to 4 acting as the closing arrangement therefore has the two catch hooks 6 as vehicle-body-side closing parts which are integrated in each A-column 2. These may be connected via the respective Bowden cable 10 by way of one adjustable coupling element, respectively with the control piston. The coupling element can be configured as an operating rod provided with a corresponding adjusting thread. As the result of the fact that, according to the invention, the closing arrangement and thus the convertible top locking system is placed in the two A-columns, a particularly space-saving arrangement is created which, in addition, permits the design of the windshield frame, including the windshield cross member and the A columns in an improved manner with respect to the stiffness and the arrangement relative to the head path curve of the vehicle occupants. As a result of the use of the Bowden cables, the arrangement of the driving unit, including the control pistons, inside the vehicle is very variable. The arrangement can be provided particularly in the A column footing, in the assembly space or in the area of a wheel house. Because the entire arrangement uses a "ball point pen" principle, the respective catch hook unit can be constructed to be relatively slender and have small dimensions.

Optionally, the catch hook unit, including the Bowden cable, can be introduced through a corresponding opening in the upper A column end and can be fixed by a screw cap. In the event of disturbances of the operating function of the convertible top locking system, a separate exchange of the catch hook unit, including the Bowden cable, or of the driving unit with or without the working cylinder formed by the control piston and the housing can take place. Since the entire convertible top locking system is arranged outside the vehicle interior, there can be no danger of contamination by emerging hydraulic oil.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating system for a movable motor vehicle part, comprising a driving unit, an operating element for the movable motor vehicle part, and a control unit operatively connecting the driving unit and the operating element, wherein the control unit has a control piston configured to be loaded in one axial direction by the driving unit and in an opposite axial direction by a mechanical pressure spring arrangement, which control piston is restrictedly guided in a vehicle-fixed housing by a control contour in a circumferential direction and the axial directions, and is connected with the operating element in a movement-transmitting manner.

2. The operating system according to claim 1, wherein the control contour is a profile groove extending on an outer circumference of the control piston so as to be engageable by a guiding pin fixed on an inner circumference of the fixed housing.

3. The operating system according to claim 1, wherein the control contour has at least one intermediate stop which defines an intermediate position in which the control piston can be positioned in a spring-loaded manner.

4. The operating system according to claim 3, wherein the control contour is a profile groove extending on an outer circumference of the control piston so as to be engageable by a guiding pin fixed on an inner circumference of the fixed housing.

5. The operating system according to claim 1, wherein the control contour is divided into plural zigzag-type adjoining contour sections, at least a first of contour sections extending diagonally along an outer circumference of the control piston and being actable upon by spring force, and at least a second, adjoining contour section being axially aligned on the outer circumference to be hydraulically actable upon.

6. The operating system according to claim 5, wherein at least one transition area between two adjoining contour sections is provided with a guiding stop bevel.

7. The operating system according to claim 1, wherein the movable motor vehicle part is a retractable vehicle roof which, by way of roof-side closing parts, is fixable on vehicle-body-side closing parts, and the vehicle-body-side closing parts are operating elements integrated in vehicle A columns.

8. The operating system according to claim 7, wherein the control unit is integrated at least partially in the respective A column.

9. The operating system according to claim 7, wherein each of the closing parts is connected by a tension/pressure device comprised as a Bowden cable, with the respective driving unit.

10. The operating system according to claim 9, wherein the control unit is integrated at least partially in the respective A column.

11. The operating system according to claim 9, wherein the respective tension/pressure device extends inside the respective A-column.

12. The operating system according to claim 11, wherein tension/pressure device is operatively connected with the closing part by an adjustable coupling element.

13. The operating system according to claim 7, wherein the vehicle-body-side closing parts are integrated laterally next to the windshield cross member in the A columns.

* * * * *